United States Patent Office 2,730,194
Patented Jan. 10, 1956

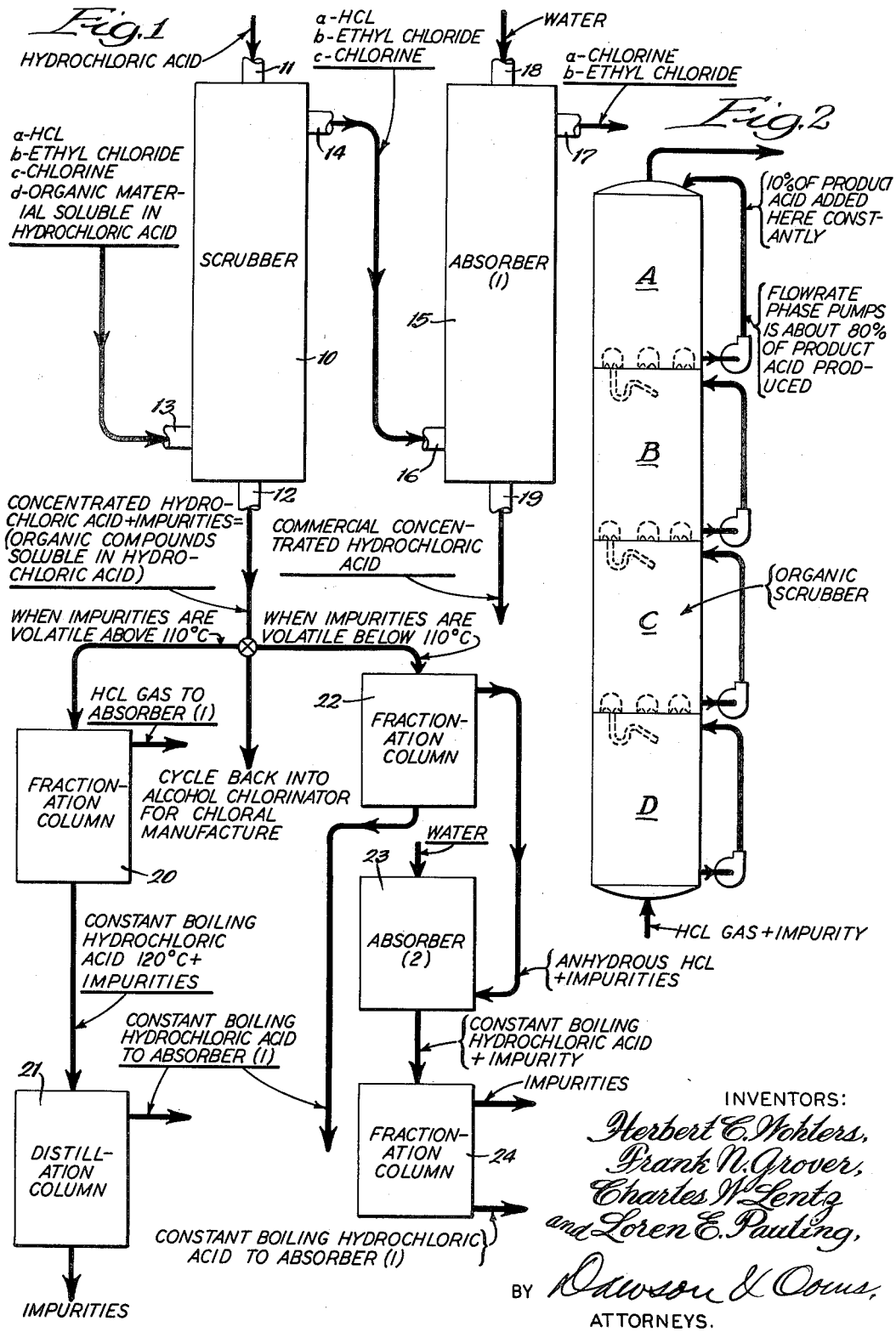

2,730,194

HYDROCHLORIC ACID FROM CHLORAL VENT GASES

Herbert C. Wohlers, St. Louis, Frank N. Grover, Alma, and Charles W. Lentz and Loren E. Pauling, St. Louis, Mich., assignors to Michigan Chemical Corporation, St. Louis, Mich., a corporation of Michigan Application April 4, 1952, Serial No. 280,488

12 Claims. (Cl. 183—115)

This invention relates to a gas recovery system and it relates more particularly to the separation and recovery of hydrogen chloride, hydrogen bromide and other gaseous substances from waste gases discharged such as from brominators or from chlorinators engaged in the preparation of chloral and related products by alcohol chlorination, paraldehyde or acetaldehyde chlorination.

In the description herein, reference will be made generally to the recovery of hydrogen chloride, but it will be understood that the principles will apply equally well to the recovery of hydrogen bromide in the manufacture of hydrobromic acid and the like.

Recovery of hydrogen chloride from the vent gases of a chlorinator, as in the manufacture of chloral, poses many of the problems characteristic of the recovery of hydrogen chloride from other gas systems but, in addition, a number of particularly difficult problems are imposed because of the presence also of large amounts of free chlorine and relatively large amounts of chloral hydrate, chloral and other impurities such as monochloroacetaldehyde, dichloroacetaldehyde resulting from the chlorination of acetaldehyde or paraldehyde or ethyl chloride resulting from chlorination of ethyl alcohol.

The removal of organic matter, such as chloral hydrate and chloral, which are soluble in hydrochloric acid and would contaminate product acid resulting from the recovery has to the present offered the greatest difficulty. Attempts have been made to remove the organic materials by adsorptive charcoal but such techniques have proven unsuccessful. Other systems have made use of a series of coolers and separators ranging in temperature from +20° C. to −30° C. but the initial cost for coolers, refrigerators and separators and the operation thereof has rendered this technique impractical. Many other systems have been advanced by the art but for various reasons were incapable of use in an economical manner to effect the desired results.

It is an object of this invention to provide a method and apparatus for the recovery of hydrogen chloride and hydrogen bromide in substantially pure form from gas systems in an efficient and in an economical manner.

More specifically, it is an object of this invention to provide a method and apparatus for purifying and separating hydrogen chloride from vent gases produced by ethanol acetaldehyde or paraldehyde chlorination and the like and it is a related object also to recover chloral hydrate for recirculation into the original system in the manufacture of chloral.

A further object is to provide various systems for the recovery and purification of materials resulting from the separation of hydrogen chloride and hydrogen bromide gases by the techniques described and claimed herein for subsequent use of such products in manufacture and sale.

These and other objects and advantages of this invention will hereinafter appear, and for purposes of illustration, but not of limitation, an embodiment of this invention is shown in the accompanying drawing in which—

Figure 1 is a flow sheet of a system embodying features of this invention for the recovery and purification of hydrogen chloride from vent gases, and Figure 2 is an enlarged schematic view of a scrubber device which may advantageously be used in the practice of this invention.

Applicants have found that many of the compounds which have heretofore complicated hydrogen chloride recovery or have contaminated acids produced therefrom may be efficiently and substantially completely eliminated from the gaseous stream at an early stage of the recovery process without impairing the subsequent separation of the hydrogen chloride gas in the manufacture of commercial grade hydrochloric acid.

In accordance with the practice of this invention, impurities such as chloral, chloral hydrate and other organic substances normally soluble in hydrochloric acid and which would, as a result, contaminate the product acid formed in the recovery of hydrogen chloride gas, are stripped from the gas system in advance by treatment with hydrochloric acid. The stripping acid, being substantially completely saturated with hydrogen chloride, is incapable of removing substantial amounts of hydrogen chloride from the gas system while the impurities soluble in hydrochloric acid are removed from the gas stream. The amount of stripping acid required to remove the small amount of impurity is relatively insignificant compared to the amount of product acid formed by recovery of the hydrogen chloride gas. The hydrochloric acid and impurities dissolved therein may be returned to some stage of the chlorinating process from which the gases were originally discharged or the components thereof may be separated in a number of ways which will hereinafter be described. For separation of impurities from hydrogen bromide containing gas systems, the stripping acid is preferentially selected of hydrobromic acid in concentrated or substantially concentrated form.

The effluent gases from the scrubber are advanced to an absorber for treatment with water or dilute hydrochloric acid to dissolve out the hydrogen chloride and form commercial concentrated hydrochloric acid while the remainder of the gases insoluble therein are discharged into the atmosphere or to some additional recovery system.

In order to achieve efficient and effective removal of the organic impurities soluble in hydrochloric acid at an initial stage of the process, it is desirable to carry out the scrubbing action in a scrubber such as a packed column 10 having hydrochloric acid passing downwardly therethrough by gravitational force from an acid inlet 11 at the top to a discharge opening 12 at the bottom while the vent gases discharged from the reactor or chlorinator are fed through a gas inlet 13 near the bottom of the column and rise upwardly through the column to a gas outlet 14 at the top. The efficiency of the stripping action of hydrochloric acid depends greatly upon the degree of contact between the acid and the gas and for this purpose, packings such as Berl saddles, Raschig rings and the like are provided in the scrubber to increase the area of contact.

It is desirable to maintain flow of sufficient acid down through the column substantially completely to wet out the surfaces of the packing. Suitable wetting out may be achieved with as little as 5 percent by weight hydrochloric acid calculated on the amount of hydrochloric acid which is formed as a product by the recovery of the hydrogen chloride gas. While the removal of chloral, chloral hydrate and other accompanying hydrochloric acid soluble impurities increases in proportion to the amount of acid used, it is economically inadvisable to make use of hydrochloric acid in amounts greater than 25 percent by weight of the product acid unless subsequent separation of the scrubber acid from the impurity can be carried out in a simple and easy manner.

In experimental runs which have been made to the present, best results have been secured with the introduction of 10–15 percent by weight stripping acid based upon the amount of product acid. It will be understood however that variations in the size of the column, gas composition and the like will influence the most desirable amount of acid introduced for efficient stripping.

Attempts have been made to reduce the amount of acid introduced by the process of recycling a substantial proportion of the acid passed through the scrubber but it has been found that such technique, although it provides for more complete and uniform wetting out of the packing, brings hydrochloric acid containing fairly large amounts of impurities such as chloral, chloral hydrate near the gas outlet of the scrubber where such impurities may be entrained into the discharged gases for contamination of the product formed in the absorber. Recycling can however be successfully practiced where, instead of returning a certain proportion of the scrubber acids from the outlet to the acid inlet, the scrubber is divided into separate sections A, B, C and D (Figure 2) connected one to another only by means of a bubble cap for passage of gases substantially in a continuous path upwardly therethrough. When recycling is confined to each section of the scrubber individually, then the amount of chloral, chloral hydrate and the like will be of such minor proportion in the top section A as to avoid any possibility of serious contamination of the product acid thereby to secure the efficiency of a recycling process without the handicap of contaminating the final product. In a recycling system of the type described, working on a countercurrent flow principle, make-up acid may be introduced into the feed line for the top section A with overflow of equivalent amounts from one section down to the other whereby an equal amount of scrubber acid containing the highest concentration of chloral, chloral hydrate and other hydrochloric acid soluble impurities is displaced from the bottom section.

The flow of gases through the columns may be varied over a fairly wide range depending upon the capacity of the column as influenced by its length, diameter, feed rate of hydrochloric acid and the like. Excellent results have been secured with gaseous flow at the rate of 5–20 cubic feet per hour per square inch. The degree of purification varies inversely with the rate of flow. While more impurity is removed per unit time at a higher rate of flow, more impurity is also found in the product acid formed by solution of hydrogen chloride in the absorber. It is desirable to operate the scrubber at about room temperature or below but slightly elevated temperatures are not fatal so long as the temperature is insufficient to volatilize or prevent solution of chloral hydrate or other impurity in the hydrochloric acid.

As in the scrubber, it is desirable to pack the absorber with Berl saddles, Raschig rings or the like to increase the surface area and provide means for more substantial contact between the gases passing upwardly from the gas inlet 16 at the bottom of the column 15 to the gas outlet 17 at the top and the aqueous medium introduced at the inlet 18 at the top which passes by gravitational flow to the outlet 19 at the bottom. Since the other gaseous materials soluble in hydrochloric acid were previously removed in the scrubber, only hydrogen chloride is dissolved in the aqueous medium although small amounts of chlorine may become dissolved therein but is not considered harmful in the amounts present in the final product. While the amount of chlorine may range to about 2000–3000 parts per million in the product acid, dechlorination may be effected in a simple and easy manner by any of a number of well known systems to reduce the chlorine content to an insignificant 10–20 parts per million. It is desirable to balance the rate of flow of gases and aqueous medium fed to the absorber substantially completely to remove the hydrogen chloride so that practically none is to be found in the gaseous material discharged and to dissolve sufficient hydrogen chloride to form concentrated hydrochloric acid by the time that the aqueous medium is discharged at the bottom of the absorber. Solution of hydrogen chloride in the aqueous medium to form hydrochloric acid takes place with the generation of heat. For most efficient operation it is desirable to maintain temperatures in the absorber to as low a level as possible and for this purpose cooling may be provided by means of a cooling jacket or cooling coils extending through the absorber.

The concentrated hydrochloric acid containing impurities dissolved therein may be processed for recovery of the acid and impurities in a number of ways depending upon the character of the impurities.

In the event that the vent gases were discharged from a chlorinator used in ethanol acetaldehyde or paraldehyde chlorination to produce chloral, the impurity dissolved in the hydrochloric acid will consist mainly of chloral, chloral hydrate and the like present in concentrations ranging from 5–50 mg./ml. This product can be fed back into any part of the chlorination process but preferably to a latter stage of the synthesis.

In the event that the impurity has a boiling point above 110° C., which is the boiling point for constant boiling hydrochloric acid (containing about 20% hydrogen chloride), the residue from the scrubber may be treated first in a fractionating column 20 operated to distill off substances boiling below 110° C. which will include mainly anhydrous hydrogen chloride gas in amounts to reduce the concentrated hydrochloric acid (containing 30–35% hydrogen chloride) to constant boiling hydrochloric acid.

The anhydrous hydrogen chloride can be advanced to the absorber previously described for recovering hydrogen chloride in the formation of concentrated hydrochloric acid.

The residue from the fractionating column 20 containing the impurity dissolved in constant boiling hydrochloric acid may then be treated in a distillation column 21 to vaporize off the constant boiling hydrochloric acid which may be condensed and returned as a part of the aqueous medium fed to the absorber for conversion of hydrochloric acid while the residue of the distillation column will comprise the impurities which boil above 110° C.

In the event that the impurities volatilize at a temperature up to 110° C., the residue from the scrubber may be treated in a fractional distillation column 22 to vaporize off material boiling below 110° C. The vapors will be made up of anhydrous hydrogen chloride gas plus the impurity while the residue will be constant boiling hydrochloric acid which can be fed with the aqueous medium to the absorber 15. The gases discharged from the fractional distillation column 22 may be fed to another absorber 23 into which water is fed at the top to dissolve the gases fed at the bottom to form constant boiling hydrochloric acid in which the impurity is dissolved. Thereafter the material may be subsequently treated in another fractionating column 24 to volatilize off all that boils up to 110° C. thereby to separate off the impurity from the constant boiling hydrochloric acid which can be fed with the aqueous medium to the absorber for the production of concentrated hydrochloric acid. In the event that the impurity comprises combinations of material boiling above and below 120° C., a first step may be required to achieve separation along this line followed by a combination of the steps previously described.

In a one step system having some advantages over the above, if the impurities boil above 110° C., water may be added to the stripping acid to reduce the acid concentration to that of constant boiling acid. Then distillation at 110° C. will remove all of the acid, leaving impurity as a residue. If the impurities volatilize below 110° C., water may be added in amounts to reduce the acid to constant boiling and then distillation at 110° C. will volatilize off the impurity, leaving constant boiling hydrochloric acid as residue. The corresponding breaking point for the hydrobromic acid system is at its constant boiling temperature of about 126° C. which contains about 47 percent hydrogen bromide.

The following example will illustrate the practice of this invention in the recovery of gases discharged from alcohol chlorination to produce chloral.

The vent gases from the chlorinator have been analyzed on the average to contain the following in percent by weight:

74–75 percent hydrogen chloride
15–16 percent chlorine
9–10 percent ethyl chloride
0.1–2.5 percent chloral hydrate In the experimental work two scrubbers were used in series each measuring 1 inch in diameter and packed to a depth of 40 inches with ¼ inch Berl saddles. The hydrogen chloride absorber comprised a column 1 inch in diameter packed to a length of about 44 inches with Berl saddles and jacketed for cooling.

In operation, vent gases from the chlorinator were first passed through a trap to remove solids and then introduced into the second scrubber at a flow rate of about 10 cubic feet per hour. The scrubbing acid, such as product acid or reagent hydrochloric acid was introduced into the first scrubber at a rate of about 10 percent of the product acid. From the first scrubber the acid was introduced to the top of the second scrubber while the gas discharged from the second scrubber was drawn into the bottom of the first scrubber.

The concentrated hydrochloric acid discharged from the base of the second scrubber contained from 20–30 mg. chloral hydrate per ml. The gas discharged from the first scrubber was metered into the base of the absorber while water was fed into the top at a rate to extract substantially all of the hydrogen chloride gas and produce concentrated hydrochloric acid as product acid having the following analysis:

| | |
|---|---|
| HCl assay | 33.16 percent |
| Organics | 0.08 percent |
| Solids (dissolved) | 0.009 percent |
| Insolubles | |
| Color | Yellow |
| Fe | 2.9 p. p. m. |
| $Cl_2$ | nil |
| $SO_4$ | 0.001 percent |
| As | |

Without treatment in the manner described to remove impurity in advance, the product acid would contain 0.5–0.6 percent organics calculated on the amount of chloral. Other organics will probably increase in proportion as impurity in the final product.

It will be understood from the foregoing that we have provided a simple, efficient and economical system for the removal of impurities which have heretofore presented considerable difficulty in the recovery of hydrogen chloride or hydrogen bromide gas whereby recovery to form commercially usable acids without the use of expensive equipment or a number of processing steps is available. It will be understood that other impurities in addition to chloral and chloral hydrate may be present but the calculations referred to for purposes of discussion have been based upon the amount of impurity in the form of chloral and chloral hydrate in the products. It will be further understood that the concepts described herein are capable of modification within limitations imposed by equipment, their capacity and materials without departing from the spirit of the invention, especially as defined in the following claims.

1. The method of treating an off gas of a halogenation process to recover hydrogen halide from the off gas as a substantially pure acid in which the off gas contains the hydrogen halide as a principal constituent thereof in admixture with gaseous impurities some of which are soluble in the acid and the others of which are not, comprising the steps of scrubbing the off gas with a concentrated acid of the hydrogen halide in amounts of less than 25 percent by weight of the product acid capable of being formed of the hydrogen halide in the off gas whereby the constituents in the off gas soluble in the concentrated acid are dissolved in the scrubbing acid to effect separation from the remainder which now consists of gaseous hydrogen halide and the gaseous impurities insoluble in the acid, contacting the remainder of the off gas with aqueous medium whereby the hydrogen halide is dissolved to produce the corresponding acid in which the remaining impurities are insoluble thereby to produce a relatively pure acid of the hydrogen halide while the remainder formed of impurities insoluble in the acid escapes in gaseous form.

2. The method of treating an off gas of a chlorination process to recover hydrogen chloride from the off gas as a substantially pure hydrochloric acid in which the off gas contains the hydrogen chloride as a principal constituent thereof in admixture with gaseous impurities some of which are soluble in hydrochloric acid and the others of which are not, comprising the steps of scrubbing the off gas with hydrochloric acid in amounts less than 25 percent by weight of the hydrochloric acid secured as a product from the hydrogen chloride in the off gas and which becomes concentrated by the time that it first engages the off gas whereby the acid soluble constituents in the off gas are dissolved in the scrubbing acid for separation from the remainder which now consists of gaseous hydrogen chloride and the gaseous impurities insoluble in hydrochloric acid, contacting the remainder of the off gas with aqueous medium whereby the hydrogen chloride is dissolved in the aqueous medium to produce hydrochloric acid in which the remaining impurities are insoluble whereby the remainder of the off gas formed of impurities insoluble in hydrochloric acid escapes in gaseous form and a relatively pure hydrochloric acid is formed as a product.

3. In the method as claimed in claim 2 in which the gaseous impurities soluble in the scrubbing acid have a boiling point above the boiling-point temperature of constant boiling hydrochloric acid, the additional steps of recovering the hydrogen chloride from the scrubbing acid in which the solution of the scrubbing acid with the solubles therein which is separated from the gases containing the hydrogen chloride and other gases insoluble in hydrochloric acid is fractionated at a temperature corresponding to the boiling point for the constant boiling acid to produce anhydrous hydrogen chloride as a product and constant boiling acid with the solubles dissolved therein, and then fractionating the solution to the boiling point for the constant boiling acid to produce constant boiling acid as a vapor product leaving the solubles as a residue.

4. In the method as claimed in claim 2 in which the impurities soluble in the acid have a boiling point below the boiling-point temperature of the constant boiling hydrochloric acid, the additional steps of recovering the hydrogen chloride from the scrubbing acid in which the scrubbing acid containing the solubles therein which is separated from the remaining gases is fractionated at the boiling point temperature for the constant boiling acid to eliminate hydrogen chloride and the solubles as a vapor and leaving constant boiling acid as the residue, contacting the vapor with an aqueous medium to absorb the hydrogen chloride and form the corresponding acid with the impurity dissolved therein, and then fractionating the solution at the boiling point temperature for constant boiling acid to vaporize the solubles and leave the constant boiling acid as the product.

5. The method of treating an off gas of a chlorination process to recover hydrogen bromide from the off gas as a substantially pure hydrobromic acid in which the off gas contains the hydrogen bromide as a principal constituent thereof in admixture with gaseous impurities some of which are soluble in hydrobromic acid and the others of which are not, comprising the steps of scrubbing the off gas with hydrobromic acid in amounts less than 25 percent by weight of the hydrobromic acid secured as a product from the hydrogen bromide in the off gas and which becomes concentrated by the time that the scrubbing acid first engages the off gas whereby the acid soluble constituents in the off gas are dissolved in the scrubbing acid for separation from the remainder which consists of gaseous hydrogen bromide and the gaseous impurities insoluble in hydrobromic acid, contacting the remainder of the off gas with aqueous medium whereby the hydrogen bromide is dissolved in the aqueous medium to produce hydrobromic acid as a product in which the remaining gaseous impurities are insoluble so that the impurities escape as a gas leaving a relatively pure hydrobromic acid as a product containing the hydrogen bromide of the off gas.

6. The method of treating an off gas in which the off gas contains hydrogen halide as a principal constituent thereof in admixture with gaseous impurities some of which are soluble in the acid of the hydrogen halide and the others of which are not, comprising the steps of scrubbing the off gas with an acid of the hydrogen halide in amounts less than 25 percent by weight of the acid capable of being formed by the hydrogen halide in the off gas and which becomes a concentrated acid by the time that the off gas first engages the acid whereby the acid soluble constituents in the off gas are dissolved in the concentrated scrubbing acid for separation from the remainder which thereafter includes gaseous hydrogen halide and the gaseous impurities in the off gas which are insoluble in the acid, separating the scrubbing acid with the impurities dissolved therein from the remainder of the off gas, contacting the remainder of the off gas with aqueous medium whereby the hydrogen halide is dissolved therein to produce the corresponding acid in relatively pure form while the remainder of the off gas formed of impurities insoluble in the acid escapes in gaseous form.

7. In the method as claimed in claim 6 in which the impurities soluble in the scrubbing acid have a boiling point above the boiling point temperature of the constant boiling acid of the hydrogen halide, the steps of recovering the hydrogen halide from the scrubbing acid, comprising fractionating the scrubbing acid with the impurities dissolved therein at a temperature corresponding to the boiling point temperature for the constant boiling acid to eliminate anhydrous hydrogen halide as a gaseous medium from the scrubbing acid in amounts in which the hydrogen halide is present in excess of that necessary for producing a constant boiling acid of the scrubbing acid whereby the product of the fractionation comprises the anhydrous hydrogen halide and a constant boiling acid with the soluble impurities dissolved therein, and then fractionating the constant boiling acid with the impurities by heating to the same boiling point temperature for the constant boiling acid to release the constant boiling acid as a vapor leaving the soluble impurities as a residue, and condensing the vapors of the constant boiling acid.

8. In the method as claimed in claim 7 in which the impurities soluble in the scrubbing acid have a boiling point below the boiling point temperature of the constant boiling acid of the hydrogen halide, the steps of recovering the hydrogen halide from the scrubbing acid, comprising fractionating the scrubbing acid with the impurities dissolved therein at the boiling point temperature for the constant boiling acid to eliminate hydrogen chloride and the impurities soluble in the acid as a vapor leaving constant boiling acid of the hydrogen halide as the residue, dissolving the vapors in an aqueous medium in amounts to produce an acid in which the hydrogen halide is present in amounts less than that necessary to form a constant boiling acid, and then fractionating the solution at the boiling point temperature for the constant boiling acid to vaporize off the soluble impurities and leave a constant boiling acid as the residue.

9. The method of treating an off gas containing a hydrogen halide as the major constituent in admixture with gaseous impurities some of which are soluble in the acid of the hydrogen halide and others of which are not, comprising the steps of contacting the off gas with a concentrated acid of the hydrogen halide in an amount ranging from 5–25 percent by weight of the product acid capable of being formed by the hydrogen halide in the off gas, contacting the gases of the hydrogen halide and gaseous impurities insoluble in the acid of the hydrogen halide with aqueous medium to dissolve out the hydrogen halide and form the acid of the hydrogen halide in which the impurities insoluble in the acid of hydrogen halide are incapable of being dissolved thereby to produce a relatively pure hydrogen halide as the product while the gaseous impurities insoluble in the hydrogen halide acid pass off as a gas.

10. The method of treating an off gas containing a hydrogen chloride as the major constituent in admixture with gaseous impurities some of which are soluble in hydrochloric acid and others of which are not, comprising the steps of contacting the off gas with an amount of concentrated hydrochloric acid ranging from 5–25 percent by weight of the product acid capable of being formed by the hydrogen chloride in the off gas wherein when the scrubbing acid is less than concentrated an amount of hydrogen chloride necessary to form a concentrated hydrochloric acid is first dissolved out of the off gas into the scrubbing acid to form a concentrated acid whereby the impurities soluble in concentrated hydrochloric acid are scrubbed from the off gas leaving the hydrogen chloride and the impurities insoluble in hydrochloric acid in gaseous form, containing the gaseous hydrogen chloride and gaseous impurities insoluble in hydrochloric acid with aqueous medium to dissolve out the hydrogen chloride to form hydrochloric acid in which the impurities insoluble in hydrochloric acid are incapable of being dissolved thereby to produce a relatively pure hydrochloric acid as the product while the gaseous impurities insoluble in hydrochloric acid pass off as a gas.

11. The method of treating an off gas containing a hydrogen halide as the major constituent in admixture with gaseous impurities, some of which are soluble in the acid of the hydrogen halide and others of which are not, comprising the steps of passing the off gas upwardly through a contact chamber from an inlet end to the outlet end, passing an acid of the hydrogen halide downwardly through the chamber in counter-current flow with the off gas to a fluid outlet at a point below the inlet end for the off gas and in which the scrubbing acid is introduced into the chamber in an amount corresponding to less than 25 percent by weight of the acid capable of being produced as a product of the hydrogen halide in the off gas concentrating the acid by solution of sufficient hydrogen halide from the off gas before flowing downwardly beyond the gaseous inlet whereby the concentrated acid dissolves out the acid soluble impurities from the off gas and a gas composed of the hydrogen halide and impurities insoluble in the hydrogen halide issues from the outlet of the chamber, and then passing the gaseous mixture issuing from the outlet of the first chamber into another contact chamber for passage upwardly from the inlet to the outlet, passing an aqueous medium downwardly through the chamber in counter-current flow with the off gas from an inlet to an outlet below the gaseous inlet whereby the hydrogen halide gas is dissolved by the aqueous medium to form the corresponding acid in which the remaining gaseous impurities insoluble in the acid of the hydrogen halide are incapable of being dissolved thereby to produce a relatively pure product acid while the remaining gaseous impurities pass upwardly through the contact chamber for issuance from the outlet.

12. The method of treating an off gas containing a hydrogen chloride as the major constituent in admixture with gaseous impurities, some of which are soluble in hydrochloric acid and others of which are not, comprising the steps of passing the off gas upwardly through a contact chamber from an inlet to an outlet, passing hydrochloric acid downwardly through the chamber in counter-current flow with the gas from an inlet to an outlet below the gaseous inlet and in amounts corresponding to less than 25 percent by weight of the acid capable of being produced as a product of the hydrogen chloride concentrating the acid during passage downwardly through the chamber by dissolving sufficient hydrogen chloride from the off gas prior to reaching the gaseous inlet whereby the concentrated acid dissolves out the impurities soluble in hydrochloric acid leaving a gaseous composition of hydrogen chloride and impurities insoluble in hydrochloric acid for issuance from the outlet in the chamber, and then passing the gaseous mixture issuing from the outlet of the first chamber into another contact chamber for passage upwardly from the inlet to the outlet, passing an aqueous medium downwardly through the second chamber in counter-current flow with the off gas from an inlet to an outlet below the gaseous inlet whereby the hydrogen chloride is dissolved in the aqueous medium to form hydrochloric acid in which the remaining gaseous impurities insoluble in hydrochloric acid are incapable of being dissolved thereby to produce a relatively pure product acid while the remaining gaseous impurities pass upwardly through the chamber for issuance from the outlet.

References Cited in the file of this patent

UNITED STATES PATENTS

| | | |
|---|---|---|
| 1,327,536 | Elliott | Jan. 6, 1920 |
| 1,628,829 | Drefahl | May 17, 1927 |
| 1,906,467 | Heath | May 2, 1933 |
| 2,288,865 | Baehr et al. | July 7, 1942 |
| 2,345,696 | Benning et al. | Apr. 4, 1944 |
| 2,450,414 | Benning | Oct. 5, 1948 |
| 2,490,454 | Myers | Dec. 6, 1949 |
| 2,558,011 | Sprauer et al. | June 26, 1951 |